(12) United States Patent
Bahr et al.

(10) Patent No.: US 8,342,574 B2
(45) Date of Patent: Jan. 1, 2013

(54) DEVICE ASSISTING WITH THE LOCKING OF A STEERING COLUMN

(75) Inventors: Christophe Bahr, Vendome (FR); Florian Botte, Savigny-sur-Orge (FR)

(73) Assignee: ZF Systemes de Direction Nacam Sas, Vendome (FR)

( * ) Notice: Subject to any disclaimer, the term of this patent is extended or adjusted under 35 U.S.C. 154(b) by 106 days.

(21) Appl. No.: 13/000,097

(22) PCT Filed: Jun. 30, 2009

(86) PCT No.: PCT/FR2009/000806
§ 371 (c)(1),
(2), (4) Date: Mar. 28, 2011

(87) PCT Pub. No.: WO2010/000980
PCT Pub. Date: Jan. 7, 2010

(65) Prior Publication Data
US 2011/0174028 A1 Jul. 21, 2011

(30) Foreign Application Priority Data
Jun. 30, 2008 (FR) ...................... 08 54406

(51) Int. Cl.
*B62D 1/18* (2006.01)
(52) U.S. Cl. ..................................... 280/775
(58) Field of Classification Search .................. 280/775; 74/492, 493; 70/187
See application file for complete search history.

(56) References Cited

U.S. PATENT DOCUMENTS

| | | | |
|---|---|---|---|
| 7,010,996 B2 * | 3/2006 | Schick et al. ................ | 74/492 |
| 7,861,615 B2 * | 1/2011 | Harris et al. .................. | 74/493 |
| 8,151,667 B2 * | 4/2012 | Appleyard et al. ............ | 74/493 |
| 2005/0127656 A1 | 6/2005 | Sato et al. | |

FOREIGN PATENT DOCUMENTS

| | | |
|---|---|---|
| EP | 1995149 A2 | 11/2008 |
| FR | 2822782 A1 | 10/2002 |

* cited by examiner

*Primary Examiner* — Faye M. Fleming
(74) *Attorney, Agent, or Firm* — Bachman & LaPointe, P.C.

(57) ABSTRACT

A device for the assisted locking and unlocking of an adjustable steering column has a fixed cam element secured to a column body, a moving cam element extended by an operating lever, and an articulation system coupled to a central spindle mounted between the elements and passing through the body. The articulation system includes an elastic return member intended to collaborate with two sets of complementary bosses borne respectively by each cam element and delimiting with one another, two end-of-travel stops so that by pivoting the lever, the moving cam element can be made to move between a locked position and an unlocked position via an intermediate position of unstable equilibrium.

10 Claims, 5 Drawing Sheets

DEVICE ASSISTING WITH THE LOCKING OF A STEERING COLUMN

BACKGROUND OF THE INVENTION

1. Field of the Invention

The present invention relates to a device for the assisted locking and unlocking of an adjustable steering column.

More, particularly, the present invention relates to means for assisting the locking and unlocking of the steering column with a view to adjusting it by the driver.

2. Prior Art

There already exists, in the prior art, locking devices comprising a fixed cam element secured to a column body, a moving cam element extended by an operating lever, and articulation means coupled to a central spindle mounted between the said cam elements.

However, these devices do not offer the user sufficient sensitivity or optimal ergonomy.

In fact, in the unlocked position, there is a clearance between the moving cam and fixed cam elements thus, giving a faulty feeling.

Moreover, the unlocking is carried out with constant and too little effort for the operator to feel any resistance, thus rendering the adjusting impractical.

Furthermore, the unlocking may accidentally occur from excessive impacts and vibrations.

SUMMARY OF THE INVENTION

The aim of the present invention is to remedy these drawbacks reliably and efficiently.

According to the invention, this aim is reached by means of a device of the previous type characterized in that said articulation means comprise an elastic return member intended to collaborate with two sets of complementary bosses respectively borne by each cam element and to contact each other such as to allow, by the pivoting of the lever, the moving cam element to move between a locked position and an unlocked position via an intermediate position of unstable equilibrium.

According to an advantageous characteristic, said boss sets form spacers whose gap vary according to the angular position of the moving cam element with respect to the fixed cam element.

Furthermore, said cam elements are provided bearing stroke-end stops.

According to an advantageous alternative, said return member is constituted of a helical spring extending at each of its end coils, by a connecting lug mounted in free rotation on said cam elements.

According to a specific characteristic, said lugs substantially extend along to the same direction in parallel to the central spindle.

Preferably, said central spindle is secured to the moving cam element and its end is provided with a threading for fixing to the column body.

According to another alternative, the end coils of said spring are connected to the connecting lugs via support links extending substantially perpendicular to the central spindle.

In this alternative, the support link connected to said moving cam element exhibits a concave elbow.

Furthermore, said connecting lugs are engaged in bearing-forming orifices, provided through the cam elements.

According to yet another alternative, said spring is mounted around an armature-forming cylindrical rod.

The purpose of the device of the invention is to give the driver clear information on the state of the column adjusting system.

The device of the invention offers efficient assistance for the locking/unlocking of the column with a view to adjusting it as well as a better safety of the steering apparatus in its entirety.

The effort that must be applied by the operator on the locking lever is thus lesser and this operation becomes much easier.

The intermediate equilibrium position makes it possible to reduce the effort that must be applied to the lever by the operator in order to reach the locked position.

Furthermore, the device of the invention makes it possible to prevent faulty handling and to significantly reduce the risks of breakdown or accidents linked to the adjustment and maintenance.

BRIEF DESCRIPTION OF THE DRAWINGS

The invention will be better understood from the following description by way of explanation of an embodiment of the invention, with reference to the accompanying drawings in which.

DETAILED DESCRIPTION OF THE PREFERRED EMBODIMENT(S)

Figure 1:
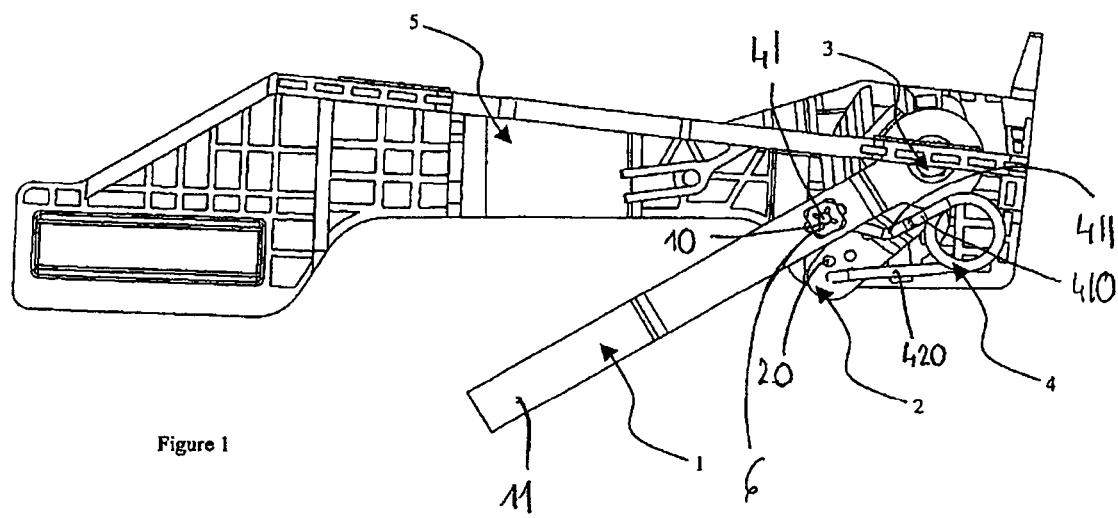
FIG. 1 represents a lateral view of an embodiment of the device of the invention.

The device of the invention is intended to equip a steering column body 5 of a motor vehicle. This body 5 is at least partially represented on the figures.

The steering column (not shown) is adjustable in longitudinal movement and in height to drivers of different morphologies.

However, the adjusting of the column can only be carried out once it has been released from the fixing and safety members that maintain it firmly in its functioning position on the body. The column adjusting system is not shown here.

After each adjustment, it is essential to block anew, the column and its adjusting system in the required position and to give the driver the guarantee that the column is locked properly.

Likewise, during the unlocking for adjustment purposes, it is judicious to give the operator an assistance and information on the status of the system.

In this perspective and as represented on the figures, the assisting device usually comprises a moving cam element 1, a fixed cam element 2 secured to the body 5 and articulation means coupled to a central spindle 3 mounted between said cam elements 1, 2 and passing through the said body.

The moving 1 and fixed 2 cam elements each comprise a part of their profile which is cylindrical and in contact with the spindle 3. The cylindrical part of the moving cam element extends radially by a handle bearing an operating lever 11.

Figure 2:
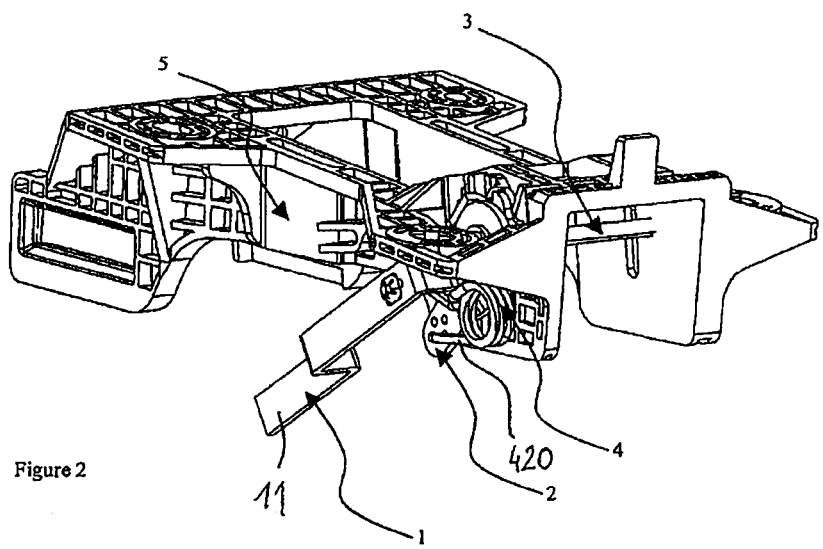
FIG. 2 represents a perspective view of the embodiment of FIG. 1.
Figure 3:
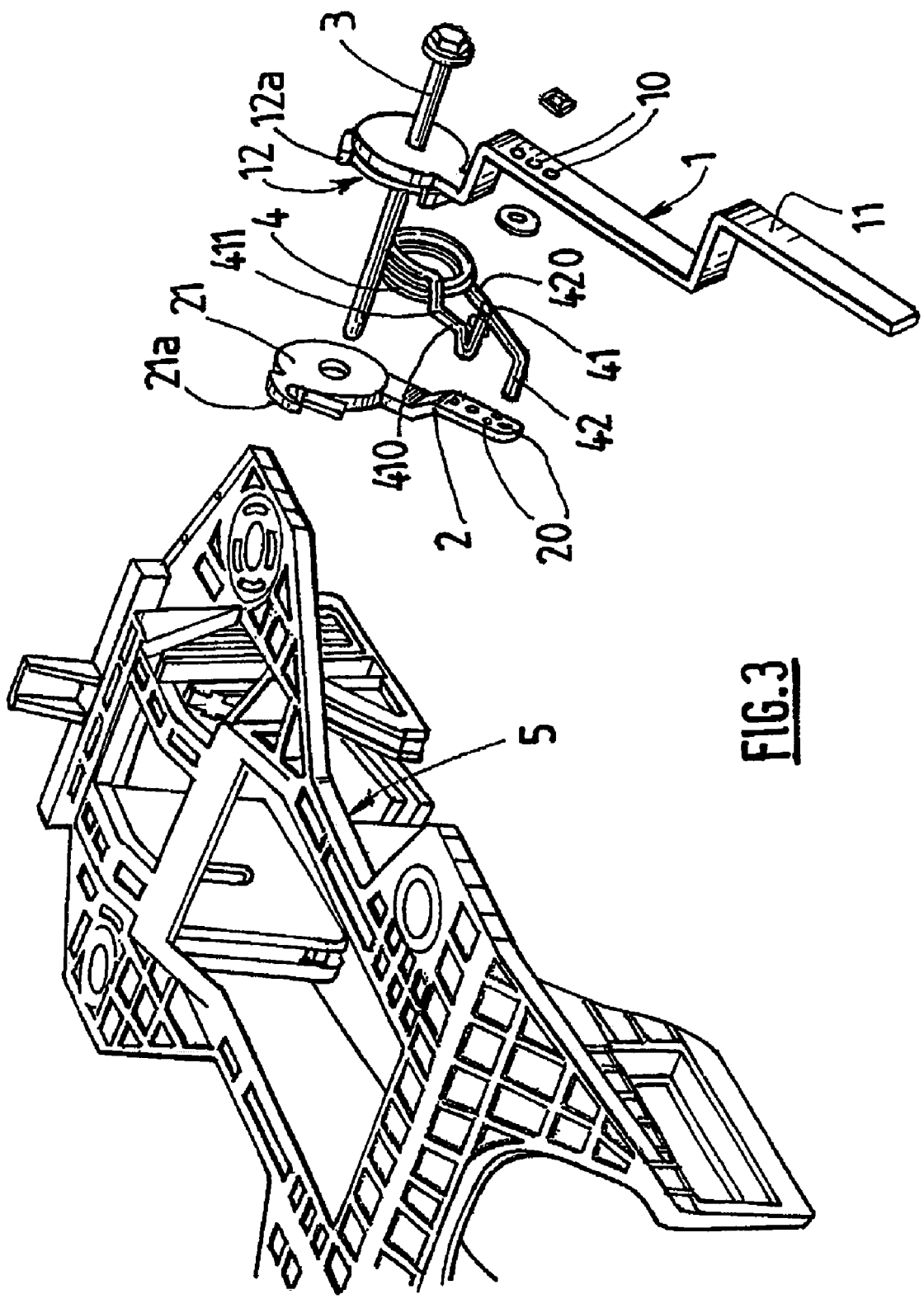
FIG. 3 represents an exploded view of the constitutive elements of the device of the invention according to FIGS. 1 and 2.
Figures 4A, 5A, 6A:
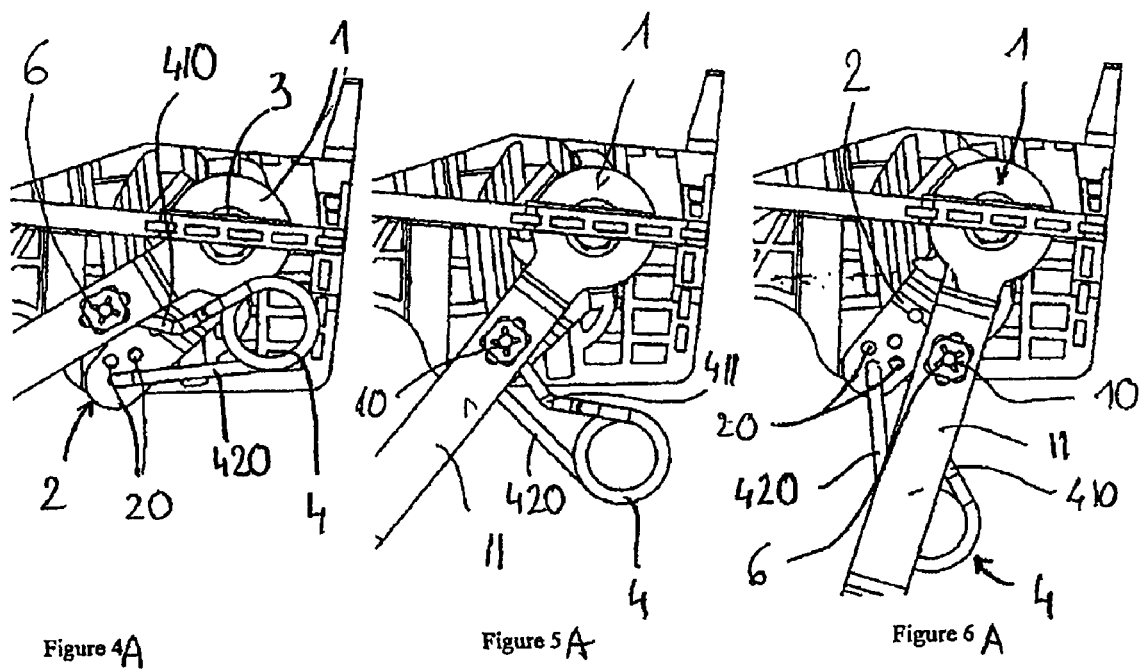
FIGS. 4A, 4B, 5A, 5B and 6A, 6B respectively represent lateral and top views of the device of FIG. 1 respectively in the three unlocked, intermediate and locked positions.
Figure 6B:
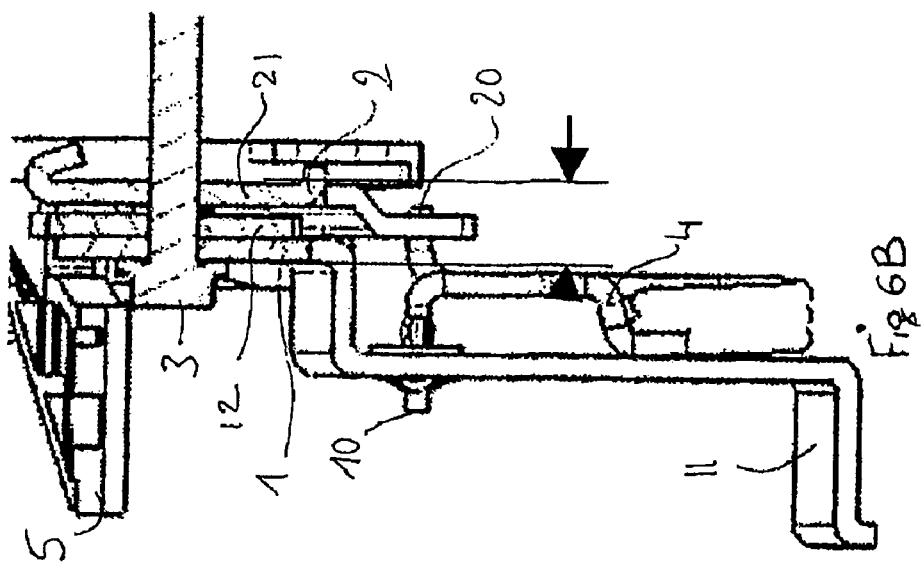
Figure 5B:
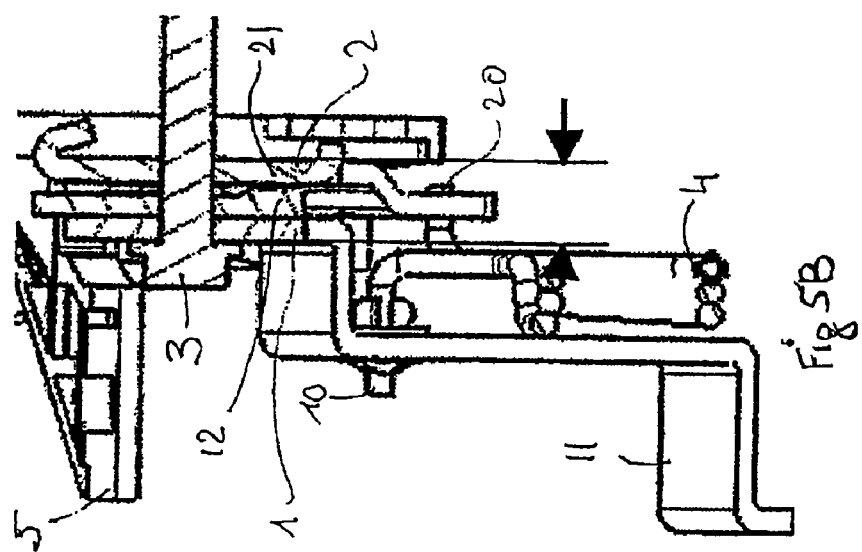
Figure 4B:
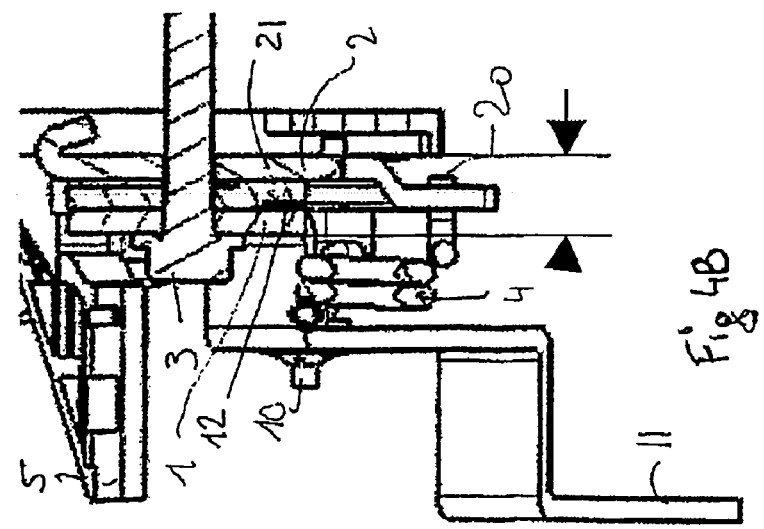

As represented, particularly in FIGS. 2 and 3, the handle and the lever 11 are, preferably, shaped such as to move away from the column body 5 to give the operator more maneuvering freedom.

In the assisting device of the invention, the articulation means comprise an elastic return member 4 intended to collaborate with two sets of complementary bosses 12, 21 borne respectively by each of the cylindrical parts of both facing cam elements 1, 2.

The sets of bosses are achieved either directly on the cam elements, or on washers brought and fixed on the inner sides of the cam elements as is the case on the moving cam element 1 of the embodiment represented on FIG. 3.

The sets of bosses together delimit two stroke-end stops 12a, 21a so that by pivoting the lever 11 the moving cam element 1 can be moved between a locked position and an unlocked position via an intermediate position of unstable equilibrium.

Figure 8:
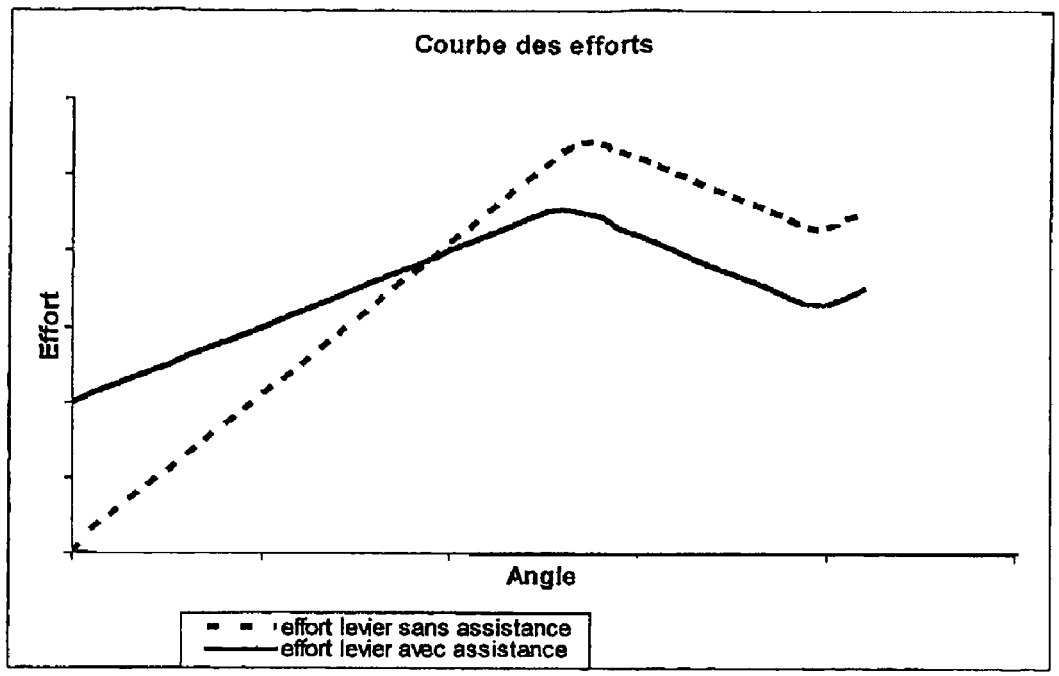
FIG. 8 is a graphic illustrating the effort to be exerted on the lever with and without the help of the assisting device of the invention.

As illustrated by FIG. 8, reaching this intermediate position requires gradual effort on the part of the operator and any insufficient effort leads to the automatic return of the moving cam element 1 and lever 11 towards the stable locked position.

Once the tension threshold is reached, the moving cam element 1 reaches the stable unlocked position without excessive effort, helped by the action of the return member.

The sets of bosses 12, 21 form spacers that vary according to the angular position of the moving cam element 1 with respect to the fixed cam element 2.

The contact of bosses 12 of the moving cam element 1 with the bosses 21 of the fixed cam element 2 is carried out by pivoting the lever 11. This forced contact leads to the transversal movement of the spindle 3 borne by the moving cam element 1 and the releasing of the column.

Here, the elastic return member 4 is constituted by a helical spring extending, at each of its end coils, by a connecting lug 41, 42 mounted in free rotation on said cam elements 1, 2.

The lugs 41, 42 substantially extend along the same direction and in parallel to the central spindle 3.

Other types of springs may be used such as leaf springs, spiral springs, conical spring or any other means that ensures an elastic return.

In the embodiments represented here, the central spindle 3 is secured to the moving cam element 1, for example, by crimping, and its end is provided with a threading for fixing to the body 5 so as to ensure, after screwing, the immobilization of the column.

In the embodiment of FIGS. 1 to 6, the spring 4 is a torsion spring whereof the axis is parallel to the central spindle corresponding to the rotation spindle 3 of the moving cam element 1.

The end coils of the spring 4 are connected to the connecting lugs 41, 42 via support links 410, 120 extending substantially perpendicular to the central spindle 3.

The support link 410 connected to the moving cam element 1 exhibits a concave elbow 411. The concavity of this elbow is substantially oriented towards the other link 420.

The connecting lugs 41, 42 are engaged in bearing-forming orifices 10, 20 which are provided through cam elements 1, 2.

Preferably, at least one lug 41 is provided with fine longitudinal grooves collaborating with a split washer 6 which is brought to block it in one of the orifices 10 depending on the chosen tension for the spring 4.

Figure 7:
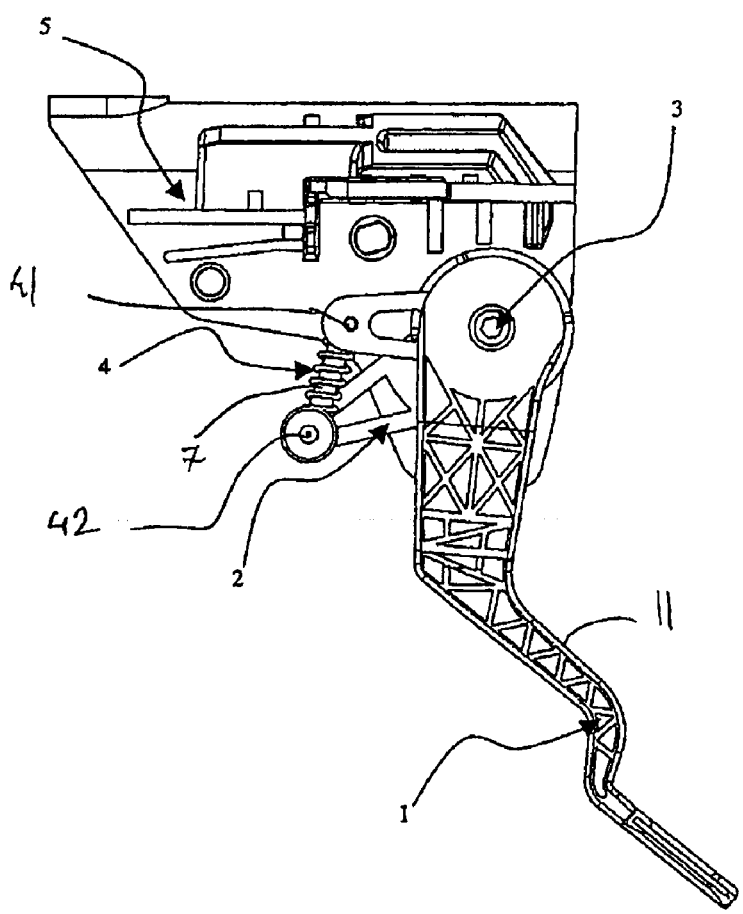
FIG. 7 represents a lateral view of another embodiment of the device of the invention.

In the embodiment of FIG. 7, the spring 4 is helical and arranged according to a perpendicular axis to the rotation spindle 3 of the moving cam element 1.

Here, this spring has no support links and is directly mounted by its connecting lugs 41, 42 on the cam elements 1, 2 by surrounding an armature forming cylindrical rod 7.

It would also be possible to provide that the spring be wound on the rotation spindle 3 or even on the cam elements.

The functioning principle of the device of the invention for assisting the locking/unlocking of the cam elements is illustrated by the graphic of FIG. 8. The principle is as follows.

In unlocked position, the respective bosses 12, 21 of the cam elements 1, 2 are in angular shifting. The tension in the device is null and the lever 11 is at rest with a certain clearance resulting from the absence of constraint.

When the operator activates the lever 11, the moving cam element 1 swivels and the angular shifting of the complementary bosses 12, 21 progressively lessens until they come in contact with each other.

This relative rotation movement causes a forced pressing of the bosses of the moving cam 1 against those of the fixed cam 2 and leads to a spacing of the two cams, which translates as a placing under tension of the body 5 and a locking of the steering column.

During this operation which is represented on FIGS. 4A and 4B to 6A and 6B (in the direction corresponding respectively to the switching from unlocked position to locked position), the spring 4 performs a rotation movement around the axis passing by its anchoring point 20 on the fixed cam element 2 whereas its other anchoring point 10 on the moving cam element 1 carries out a pendular movement, centered on the anchoring point 20.

The distance between the two anchoring points 10, 20 of the spring 4 and hence the tension of this spring, varies according to the angular position of the moving cam element 1. The tension variation is felt by the operator through an increase or decrease of effort at the lever 11 depending on the system position.

The three positions of the device may thus be defined as follows:

unlocked position (FIGS. 4A, 4B): the spring 4 is in compression and transmits effort to the moving cam 1 in order to maintain it in this position. The assistance is thus negative as the tension of the spring is higher than the initial effort of the operator. The spacing between the cams is at its minimum;

intermediate position (FIGS. 5A, 5B): the effort which must be deployed by the operator must first be increased to overcome the spring return force and reach the constraint threshold which corresponds to the unstable equilibrium of the moving cam element 1 and thus of the lever 11. In this first step, the assistance is still negative. Then, at the switching of the equilibrium, the force direction inverts as represented on FIG. 8 and the effort deployed by the operator becomes assisted by the force generated by the device via the spring 4. The assistance becomes positive and leads the moving cam element 1 towards a stable stop position;

locked position (FIGS. 6A, 6B): the spring is still in compression and transits a weak effort to the moving cam element 1 yet sufficient to maintain it in this stable position. The spacing apart of the cams is at its maximum and there is no axial clearance. The assistance is still positive and the operator will only need to exert slight effort to bring the lever 11 back towards the intermediate position.

The invention is described in what precedes by way of example. It is obvious that the skilled person is able to achieve various alternatives of the invention without departing from the framework of the patent.

The invention claimed is:

1. A device for the assisted locking and unlocking of an adjustable steering column comprising
 a fixed cam element secured to a column body,
 a moving cam element extended by an operating lever,
 articulation means coupled to a central spindle mounted between the said elements and passing through said body, said articulation means comprising an elastic return member intended to collaborate with two sets of complementary bosses respectively borne by each cam element and intended to contact each other so as to allow, by the pivoting of the lever, the moving cam element to move between a locked position and an unlocked position via an intermediate position of unstable equilibrium.

2. The device as claimed in claim 1, wherein the said sets of bosses form spacers whose gap vary according to the angular position of the moving cam element with respect to the fixed cam element.

3. The device as claimed in claim 1, wherein said cam elements bear stroke-end stops.

4. The device as claimed in claim 1, wherein said return member is composed of a helical spring extending, at each of its end coils, by a connecting lug mounted in free rotation on said cam elements.

5. The device as claimed in claim 4, wherein said connecting lugs substantially extend along the same direction in parallel to the central spindle.

6. The device as claimed in claim 1, wherein said central spindle is secured to the moving cam element and its end is provided with a threading for fixing to the column body.

7. The device as claimed in claim 4, wherein the end coils of said spring are connected to the connecting lugs via support links extending substantially perpendicularly to the central spindle.

8. The device as claimed in claim 7, wherein the support link connected to said moving cam element exhibits a concave elbow.

9. The device as claimed in claim 4, wherein said connecting lugs are engaged in bearing forming orifices, provided through the cam elements.

10. The device as claimed in claim 4, wherein said spring is mounted around an armature forming cylindrical rod.

* * * * *